US009311716B2

(12) United States Patent
Codella et al.

(10) Patent No.: US 9,311,716 B2
(45) Date of Patent: Apr. 12, 2016

(54) STATIC IMAGE SEGMENTATION

(71) Applicant: International Business Machines Corporation, Armonk, NY (US)

(72) Inventors: Noel C. Codella, Yorktown Heights, NY (US); Gang Hua, Livingston, NJ (US); John R. Smith, New York, NY (US)

(73) Assignee: International Business Machines Corporation, Armonk, NY (US)

(*) Notice: Subject to any disclaimer, the term of this patent is extended or adjusted under 35 U.S.C. 154(b) by 73 days.

(21) Appl. No.: 14/277,321

(22) Filed: May 14, 2014

(65) Prior Publication Data
US 2015/0332469 A1    Nov. 19, 2015

(51) Int. Cl.
*G06K 9/46* (2006.01)
*G06T 7/00* (2006.01)
*G06K 9/62* (2006.01)
*G06T 7/40* (2006.01)

(52) U.S. Cl.
CPC ........... *G06T 7/0081* (2013.01); *G06K 9/46* (2013.01); *G06K 9/4604* (2013.01); *G06K 9/4652* (2013.01); *G06K 9/6215* (2013.01); *G06T 7/408* (2013.01); *G06K 2009/4666* (2013.01)

(58) Field of Classification Search
CPC combination set(s) only.
See application file for complete search history.

(56) References Cited

U.S. PATENT DOCUMENTS

2005/0049826 A1    3/2005  Zhang

FOREIGN PATENT DOCUMENTS

EP        1891579 A2     2/2008
WO    2006103629 A1    10/2006

OTHER PUBLICATIONS

Ostrovskyet et al. Visual Parsing After Recovery From Blindness, Psychological Science 2009 20:1484.
Xu et al. Streaming Hierarchical Video Segmentation, in Proceedings of European Conference on Computer Vision, 2012.

*Primary Examiner* — Duy M Dang
(74) *Attorney, Agent, or Firm* — Ryan, Mason & Lewis, LLP

(57) ABSTRACT

Methods, systems, and computer program products for static image segmentation are provided herein. A method includes segmenting a static image containing a target object into multiple regions based on one or more visual features of the static image; analyzing video content containing the target object to determine a similarity metric across the multiple segmented regions based on motion information associated with each of the multiple segmented regions; and applying the similarity metric to the static image to identify two or more of the multiple segmented regions as being portions of the target object.

20 Claims, 2 Drawing Sheets

STATIC IMAGE SEGMENTATION

FIELD OF THE INVENTION

Embodiments of the invention generally relate to information technology, and, more particularly, to image segmentation.

BACKGROUND

In existing computer-related image segmentation approaches, the boundaries between objects, often, are not clearly defined, or are arbitrary. Additionally, algorithms associated with such existing approaches that attempt to segment a scene into meaningful and/or salient regions commonly lack an ability to determine a unifying and general metric for visual similarity that reliably groups sub-regions of an object into a single object.

In some such approaches, hierarchical segmentation algorithms attempt to create a hierarchy of segmentations at each of multiple levels by changing the criteria for clustering to be most particular at the leaf descendent levels and most inclusive at the higher parent ancestor levels. However, such algorithms commonly result in an increase in the number of irrelevant, incomplete or incorrect segmentations.

Accordingly, a need exists for improved techniques for segmenting objects in static images.

SUMMARY

In one aspect of the present invention, techniques for static image segmentation are provided. An exemplary computer-implemented method can include steps of segmenting a static image containing a target object into multiple regions based on one or more visual features of the static image; analyzing video content containing the target object to determine a similarity metric across the multiple segmented regions based on motion information associated with each of the multiple segmented regions; and applying the similarity metric to the static image to identify two or more of the multiple segmented regions as being portions of the target object.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes biologically-inspired learning from motion for static image segmentation. At least one embodiment of the invention includes determining and learning statistical patterns and/or motion cues from video content, and using those patterns and/or motion cues to segment objects in static images.

Figure 1:
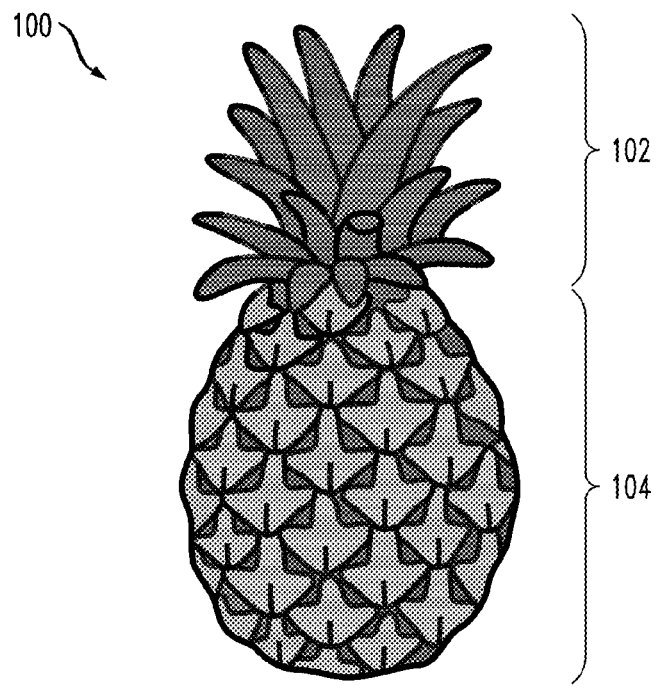
FIG. 1 is a diagram illustrating an example object that can be used for demonstrating an embodiment of the invention.

FIG. 1 is a diagram illustrating an example object, namely a pineapple 100, which can be used for demonstrating an embodiment of the invention. By way of illustration, FIG. 1 depicts region 102 of the pineapple, which corresponds to the leaves of the pineapple 100. Additionally, FIG. 1 depicts region 104 of the pineapple, which corresponds to the fruit of the pineapple 100.

As detailed above, existing image clustering approaches, such as those utilizing super pixel segmentation, include functions based solely on visual similarity (such as with respect to color, texture, shape, edges, etc.). However, when a single object has two visually distinct regions, such as depicted in the example of FIG. 1, grouping via such existing approaches is typically arbitrary and/or ineffective.

Accordingly, as described herein, at least one embodiment of the invention includes incorporating analysis of one or more motion-based aspects, as parts that belong to the same object tend to move in a coherent and cohesive fashion. Specifically, an aspect of the invention includes determining region-grouping by observing the motions of regions of a given object in video content. As such, referring back to the example depicted in FIG. 1, with existing segmentation approaches, wherein only visual similarity is considered, the pineapple is likely identified as two distinct objects corresponding to region 102 and region 104. However, in accordance with at least one embodiment of the invention, motion is additionally considered (as detailed herein), and the pineapple is identified as one object, namely, pineapple 100.

Figure 2:
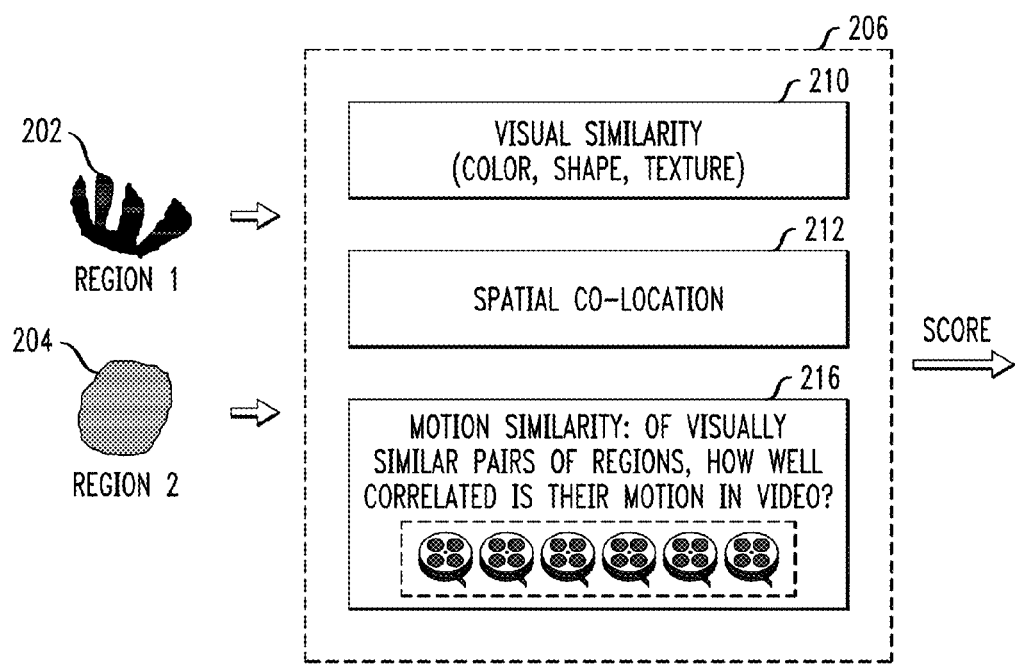
FIG. 2 is a block diagram illustrating an example embodiment, according to an aspect of the invention.

FIG. 2 is a block diagram illustrating an example embodiment, according to an aspect of the invention. By way of illustration, FIG. 2 depicts region 202 of an object and region 204 of an object (analogous to regions 102 and 104 of pineapple 100 in FIG. 1, for example). FIG. 2 also depicts a segmentation module 206, which processes visual input of the two regions, and which includes a visual similarity component 210, a spatial co-location component 212, and a motion similarity component 216. The visual similarity component 210 analyzes aspects of the regions such as color, shape, texture, etc. Additionally, the motion similarity component 216 determines, based on video content, a level of correlation in the motion or movement of the regions. Additionally, the spatial co-location component 212 determines spatial similarity between objects (or object regions) based on whether the objects are adjacent or not (for example, based on degrees of separation, a minimum number of regions separating the objects, a shortest path determination, etc.).

As detailed herein, based on the outputs of the visual similarity component 210, the spatial co-location component 212, and the motion similarity component 216, the segmentation module 206 generates and outputs an object grouping score for the two regions (that is, region 202 and region 204). Each score output from the three above-noted components represents a similarity score, which can constitute a floating point number or a real valued number. Additionally, the three similarity scores can be combined using, for example (but not limited to), the average of the three scores.

The above-detailed process can be carried out, for example, for regions that are adjacent to one another, or for regions that minimally pass some measure of spatial co-location. Also, at least one embodiment of the invention includes incorporating a threshold score that must be surpassed for two regions to be considered part of the same object. Such a threshold score is a parameter that can be learned on the data and/or can be manually adjusted. If the threshold score is learned on the data, a user will supply some additional manually annotated training data and an operating point, or a desired ratio of over-segmentation (wherein regions are larger than ideal or include regions outside the object) to under-segmentation (wherein regions are smaller than single objects to be segmented).

By way of illustration, consider the following example embodiment of the invention. Assume that a given image can be initially segmented into N regions, s(0) through s(n). Such an initial segmentation can be carried out, for example, via a superpixel segmentation algorithm, as would appreciated by one skilled in the art. If the image constitutes a frame of a video, the noted example embodiment can include using the notation s(i, t), where i represents the superpixel region and t represents time (in a predetermined unit of measure). Additionally, the video content can be derived from any video source.

Additionally, the N regions can have multiple types of distances between each other, such as in connection with feature-based clustering and/or motion displacement-based clustering. Feature-based clustering can be encompassed via the following equation: $d\_R(s(i,t),s(j,t))=(f(s(i,t))-f(s(j,t)))M(f(s(i,t))-f(s(j,t)))^{\wedge}T$, wherein d_R represents region distance (which is the inverse of region similarity), f( ) represents a feature vector extraction, ^T represents the matrix transpose, and M represents an identity matrix (or any other chosen matrix). Also, j represents a superpixel region that is different from region i. The feature vector, as noted above, can be manually specified or learned. The above-detailed feature-based clustering equation represents visual similarity of the regions in question, and can also be generalized to use kernel distances.

Motion displacement-based clustering can be encompassed via the following equation: $d\_m(s(i,t),s(j,t)))=d\_m(s(i,t))-d\_m(s(j,t))=|[L(s(i,t))-L(s(i,t+1))]-[L(s(j,t))-L(s(j,t+1))]|$, wherein L( ) represents a function returning the two-element vector of the spatial x-y coordinates of the center-of-mass (COM) of the region s(i, t). Also, d_m represents motion displacement. As noted, the two element vector is the x-y coordinate of the given region, and such values are determined by measuring the COM of the object. The COM can be measured, for example, by computing the average pixel location of the region (wherein a region covers many pixel locations, and an average value can be computed). This motion displacement-based clustering equation represents the similarity of spatial displacement across the regions in question over time.

Accordingly, an embodiment of the invention such as the example embodiment detailed herein attempts to render the visual similarity more similar to the spatial displacement over time by learning one or more types of patterns that represent the entire object rather than the individual regions themselves. To accomplish this end, one or more embodiments of the invention include optimizing the matrix M such that the objective function is minimized as follows: $((f(s(i,t))-f(s(j,t)))M(f(s(i,t))-f(s(j,t)))^{\wedge}T-C*|[L(s(i,t))-L(s(i,t+1))]-[L(s(j,t))-L(s(j,t+1))]|)^{\wedge}2$, wherein C represents a scaling constant between spatial shifts and visual similarity. The purpose of the scaling constant, C, is to bring the two components of the equation into a similar scale. The optimization, by way merely of example, can include first optimizing C and then optimizing M. An optimization algorithm can also, for instance, iterate between optimizing C and M multiple times.

Accordingly, at least one embodiment of the invention includes learning and/or determining a matrix M that renders visual similarity more similar to spatial shift similarity over time. The time parameter can be determined using an optimization algorithm, such as, for example, gradient descent or stochastic gradient descent. Additionally, matrix M can be used to further group segmentations in temporally static images (or video frames) into whole objects. Accordingly, in at least one embodiment of the invention, region clustering is determined via the equation: $((f(s(i,t))-f(s(j,t)))M(f(s(i,t))-f(s(j,t)))\hat{+}T$, wherein M has been optimized to make this equation mimic motion similarity more closely.

As such, at least one embodiment of the invention includes searching for and/or identifying video content wherein spatially adjacent segments appear to be visually similar to a target image. Using such video content, a similarity metric is determined based on motion information; namely, determining motion information associated with each of the spatially adjacent segments that reveals a level of consistency. Further, the similarity metric can be applied to one or more of the spatially adjacent segments, in connection with consideration of the target image, to group the one or more segments into higher level objects (for example, by identifying the one or more segments as parts of the object represented in the target image).

Figure 3:
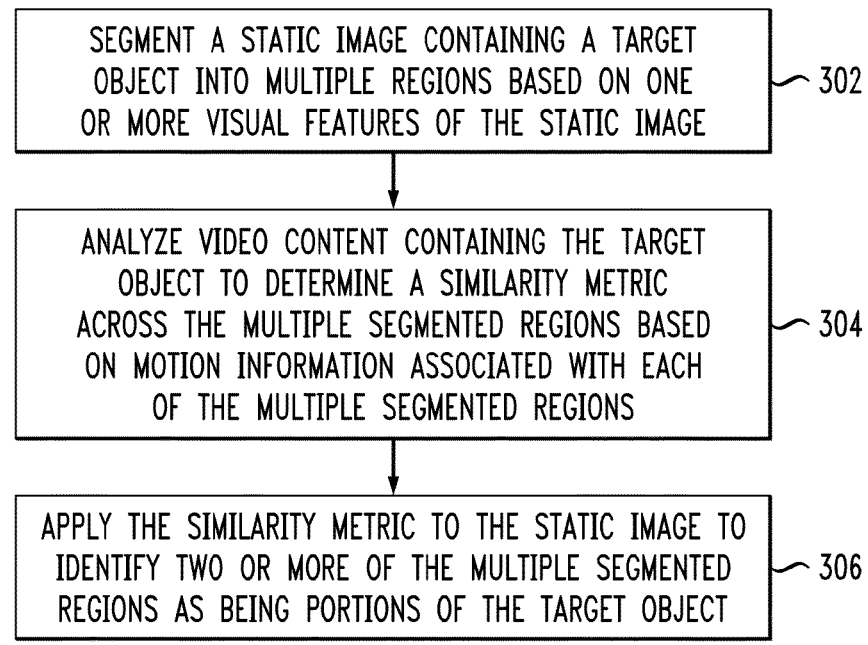
FIG. 3 is a flow diagram illustrating techniques according to an embodiment of the invention.

FIG. 3 is a flow diagram illustrating techniques according to an embodiment of the present invention. Step 302 includes segmenting a static image containing a target object into multiple regions based on one or more visual features of the static image. Segmenting based on visual features can include, for example, identifying multiple edges within the static image, identifying multiple colors within the static image, identifying multiple shapes within the static image, and/or identifying multiple textures within the static image. Additionally, segmenting the static image can include applying a hierarchical segmentation technique to the static image and/or applying a superpixel segmentation technique to the static image.

Step 304 includes analyzing video content containing the target object to determine a similarity metric across the multiple segmented regions based on motion information associated with each of the multiple segmented regions. Additionally, the techniques depicted in FIG. 3 can include searching for video content containing the target object and identifying the multiple segmented regions in the video content.

Determining the similarity metric can include, for example, determining a level of consistency in the motion information in two or more of the multiple segmented regions. Additionally, at least one embodiment of the invention includes comparing the level of consistency to a predetermined threshold value. Also, the motion information associated with each of the multiple segmented regions can include one or more statistical patterns associated with each of the multiple segmented regions. Further, in accordance with at least one embodiment of the invention, determining the similarity metric can include applying a feature-based clustering technique to the video content and/or applying a motion displacement-based clustering technique to the video content.

Step 306 includes applying the similarity metric to the static image to identify two or more of the multiple segmented regions as being portions of the target object.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
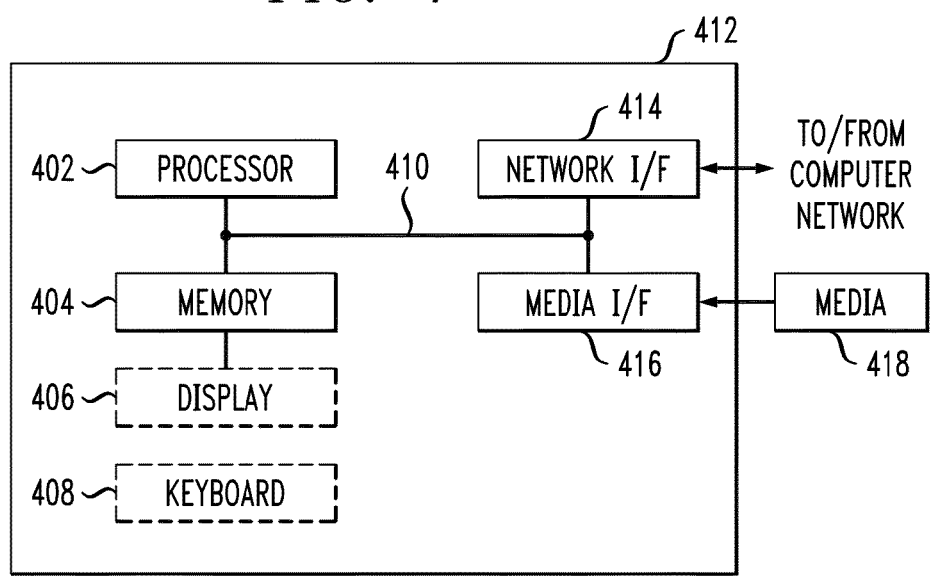
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer).

The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, learning statistical patterns from video content, and using those patterns to segment objects in static images.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   segmenting a static image containing a target object into multiple regions based on one or more visual features of the static image;
   analyzing video content containing the target object to determine a similarity metric across the multiple segmented regions based on motion information associated with each of the multiple segmented regions; and
   applying the similarity metric to the static image to identify two or more of the multiple segmented regions as being portions of the target object;
   wherein at least one of said segmenting, said analyzing, and said applying is carried out by a computing device.

2. The method of claim 1, wherein said segmenting based on one or more visual features comprises identifying multiple edges within the static image.

3. The method of claim 1, wherein said segmenting based on one or more visual features comprises identifying multiple colors within the static image.

4. The method of claim 1, wherein said segmenting based on one or more visual features comprises identifying multiple shapes within the static image.

5. The method of claim 1, wherein segmenting based on said one or more visual features comprises identifying multiple textures within the static image.

6. The method of claim 1, wherein said segmenting comprises applying a hierarchical segmentation technique to the static image.

7. The method of claim 1, wherein said segmenting comprises applying a superpixel segmentation technique to the static image.

8. The method of claim 1, wherein said determining the similarity metric comprises determining a level of consistency in the motion information in two or more of the multiple segmented regions.

9. The method of claim 8, comprising:
   comparing said level of consistency to a predetermined threshold value.

10. The method of claim 1, wherein said motion information associated with each of the multiple segmented regions comprises one or more statistical patterns associated with each of the multiple segmented regions.

11. The method of claim 1, wherein said determining the similarity metric comprises applying a feature-based clustering technique to the video content.

12. The method of claim 1, wherein said determining the similarity metric comprises applying a motion displacement-based clustering technique to the video content.

13. The method of claim 1, comprising:
    searching for video content containing the target object.

14. The method of claim 1, comprising:
    identifying the multiple segmented regions in the video content.

15. A computer program product, the computer program product comprising a non-transitory computer readable storage medium having program instructions embodied therewith, the program instructions executable by a computing device to cause the computing device to:
    segment a static image containing a target object into multiple regions based on one or more visual features of the static image;
    analyze video content containing the target object to determine a similarity metric across the multiple segmented regions based on motion information associated with each of the multiple segmented regions; and
    apply the similarity metric to the static image to identify two or more of the multiple segmented regions as being portions of the target object.

16. The computer program product of claim 15, wherein said segmenting comprises applying a superpixel segmentation technique to the static image.

17. The computer program product of claim 15, wherein said determining the similarity metric comprises determining a level of consistency in the motion information in two or more of the multiple segmented regions.

18. The computer program product of claim 15, wherein said determining the similarity metric comprises applying a feature-based clustering technique to the video content.

19. The computer program product of claim 15, wherein said determining the similarity metric comprises applying a motion displacement-based clustering technique to the video content.

20. A system comprising:
    a memory; and
    at least one processor coupled to the memory and configured for:
    segmenting a static image containing a target object into multiple regions based on one or more visual features of the static image;
    analyzing video content containing the target object to determine a similarity metric across the multiple segmented regions based on motion information associated with each of the multiple segmented regions; and
    applying the similarity metric to the static image to identify two or more of the multiple segmented regions as being portions of the target object.

* * * * *